United States Patent
Buck, Jr. et al.

(10) Patent No.: US 9,355,579 B2
(45) Date of Patent: May 31, 2016

(54) SYSTEMS AND METHODS FOR IMAGE BASED TAMPER DETECTION

(71) Applicant: BI Incorporated, Boulder, CO (US)

(72) Inventors: James J. Buck, Jr., Longmont, CO (US); Joseph P. Newell, Louisville, CO (US); Cady Lynn Brooks, Nederland, CO (US)

(73) Assignee: BI Incorporated, Boulder, CO (US)

( * ) Notice: Subject to any disclaimer, the term of this patent is extended or adjusted under 35 U.S.C. 154(b) by 0 days.

(21) Appl. No.: 14/486,698

(22) Filed: Sep. 15, 2014

(65) Prior Publication Data

US 2015/0078622 A1 Mar. 19, 2015

Related U.S. Application Data

(60) Provisional application No. 61/878,553, filed on Sep. 16, 2013.

(51) Int. Cl.
| | |
|---|---|
| *G06K 9/00* | (2006.01) |
| *G09F 3/03* | (2006.01) |
| *G06T 7/20* | (2006.01) |
| *G08B 13/196* | (2006.01) |
| *G08B 29/04* | (2006.01) |

(52) U.S. Cl.
CPC .............. *G09F 3/0376* (2013.01); *G06T 7/204* (2013.01); *G08B 13/19602* (2013.01); *G08B 29/046* (2013.01); *G06T 2207/30232* (2013.01)

(58) Field of Classification Search
None
See application file for complete search history.

(56) References Cited

U.S. PATENT DOCUMENTS

| | | | |
|---|---|---|---|
| 7,930,927 B2 | 4/2011 | Cooper et al. | |
| 8,493,219 B2 | 7/2013 | Buck et al. | |
| 8,576,065 B2 | 11/2013 | Buck et al. | |
| 8,629,776 B2 | 1/2014 | Buck et al. | |
| 8,657,744 B2 | 2/2014 | Rompa et al. | |
| 9,240,118 B2 | 1/2016 | Melton | |
| 9,241,659 B2 | 1/2016 | Rompa et al. | |
| 2009/0296197 A1* | 12/2009 | Holzwarth et al. | 359/328 |
| 2011/0154887 A1 | 6/2011 | Cooper et al. | |
| 2013/0006066 A1 | 1/2013 | Melton | |
| 2013/0107040 A1* | 5/2013 | Lee et al. | 348/140 |
| 2013/0121529 A1* | 5/2013 | Fleisher et al. | 382/103 |
| 2014/0179342 A1* | 6/2014 | Hamerly | 455/456.1 |
| 2015/0010213 A1* | 1/2015 | Lin | 382/106 |
| 2015/0048948 A1 | 2/2015 | Buck et al. | |
| 2015/0061864 A1 | 3/2015 | Buck et al. | |
| 2015/0131085 A1 | 5/2015 | Cooper et al. | |
| 2015/0228184 A1 | 8/2015 | Buck et al. | |
| 2015/0279200 A1 | 10/2015 | Buck et al. | |
| 2015/0327214 A1 | 11/2015 | Buck et al. | |

OTHER PUBLICATIONS

U.S. Appl. No. 13/919,862, filed Jun. 17, 2013, Newell et al.
U.S. Appl. No. 14/966,135, filed Dec. 11, 2015, Donald A. Melton.

* cited by examiner

*Primary Examiner* — Andrew Moyer
(74) *Attorney, Agent, or Firm* — Hamilton DeSanctis & Cha

(57) ABSTRACT

Various embodiments of the present invention provide systems and methods for monitoring movement, and in particular to systems and methods for monitoring monitor targets, and more particularly, to systems and methods for using images in relation to tamper detection.

22 Claims, 6 Drawing Sheets

SYSTEMS AND METHODS FOR IMAGE BASED TAMPER DETECTION

CROSS REFERENCE TO RELATED APPLICATIONS

The present application claims priority to (is a non-provisional of) U.S. Pat. App. No. 61/878,553 entitled "Systems and Methods for T-Ray Based Tamper Detection", and filed Sep. 16, 2013 by Buck et al. The entirety of the aforementioned provisional patent applications is incorporated herein by reference for all purposes.

BACKGROUND OF THE INVENTION

The present invention is related to monitoring movement, and in particular to systems and methods for monitoring individuals, and more particularly, to systems and methods for using images in relation to tamper detection.

Large numbers of individuals are currently housed in prisons. This represents a significant cost to society both in terms of housing expense and wasted productivity. To address this concern, house arrest systems have been developed for use by less violent offenders. This allows the less violent offender to be monitored outside of a traditional prison system and allows the offender an opportunity to work and interact to at least some degree in society. The same approach is applied to paroled prisoners allowing for a monitored transition between a prison atmosphere and returning to society. House arrest systems typically require attaching a monitoring device to a monitored individual. Such devices may be defeated through tampering, and as such the ability to monitor the individuals may be defeated.

Thus, for at least the aforementioned reasons, there exists a need in the art for more advanced approaches, devices and systems for individual monitoring.

BRIEF SUMMARY OF THE INVENTION

The present invention is related to monitoring movement, and in particular to systems and methods for monitoring individuals, and more particularly, to systems and methods for using images in relation to tamper detection.

Some embodiments of the present invention provide monitoring systems. Such monitoring systems include a monitor device. The monitor device is attachable to a monitor target, and the monitor device includes an image based tamper detection circuit operable to detect tampering with the monitor device based at least in part upon image comparison.

This summary provides only a general outline of some embodiments according to the present invention. Many other objects, features, advantages and other embodiments of the present invention will become more fully apparent from the following detailed description, the appended claims and the accompanying drawings and figures.

BRIEF DESCRIPTION OF THE DRAWINGS

A further understanding of the various embodiments of the present invention may be realized by reference to the figures which are described in remaining portions of the specification. In the figures, similar reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1:
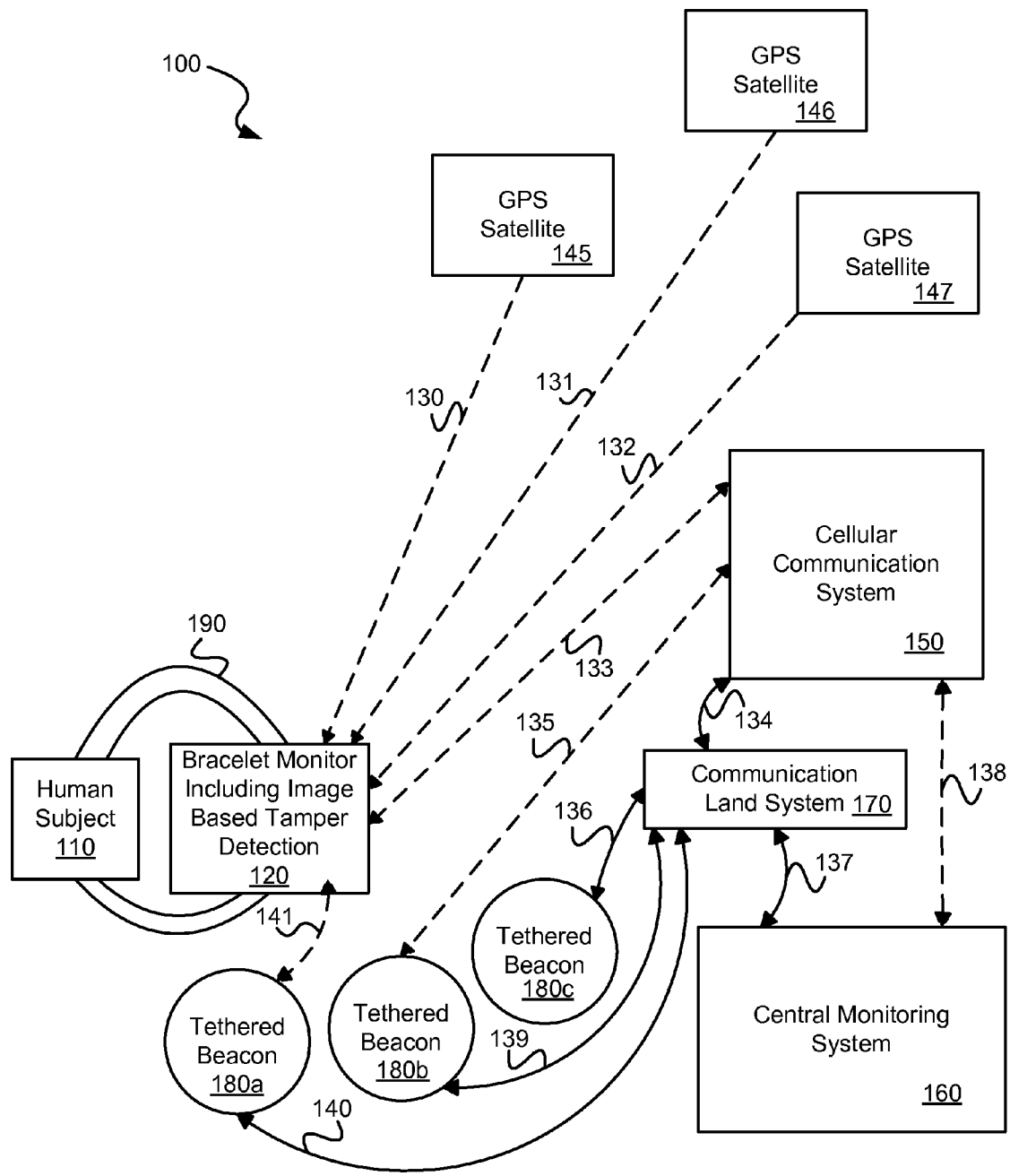
FIG. 1 is a block diagram illustrating a monitoring system including a subject device in the form of a bracelet monitor that has image based tamper detection in accordance with various embodiments of the present invention.

The present invention is related to monitoring movement, and in particular to systems and methods for monitoring individuals, and more particularly, to systems and methods for using images in relation to tamper detection.

Some embodiments of the present invention provide monitoring systems. Such monitoring systems include a monitor device. The monitor device is attachable to a monitor target, and the monitor device includes an image based tamper detection circuit operable to detect tampering with the monitor device based at least in part upon image comparison. In some instances of the aforementioned embodiments, the image based tamper detection circuit includes an image sensor operable to obtain an initial image and an update image of the monitor target. In some cases, the imaging sensor uses Terahertz radiation to form the initial image and the update image. In some such cases, the monitor device is encapsulated by a plastic case, and the initial image is captured through the plastic case.

In various instances of the aforementioned embodiments, the initial image is taken at a first time and the update image is taken at a second time, and the image based tamper detection circuit is further operable to compare the update image with the initial image to yield an image comparison result. In some cases, the initial image is captured upon attaching the monitor device to the monitor target. In one or more cases, the initial image is a leg of the monitor target, and the update image is the leg of the monitor target.

In some instances of the aforementioned embodiments, the monitor device is further operable to log an image state corresponding to a detection status. In some cases, the detection status is selected from one or an untampered status indicating no tamper was detected, or a tampered status indicating a tamper was detected. In one or more instances of the aforementioned embodiments, the monitor device includes a strap, and the initial image is captured upon connection of the strap.

Other embodiments of the present invention provide methods for device tamper detection. The methods include: providing a monitor device operable to identify a location of a monitor target, and including an image based tamper detection circuit; capturing an initial image of the monitor target using the image based tamper detection circuit at a first time; capturing an update image of the monitor target using the image based tamper detection circuit at a second time; comparing the update image with the initial image to yield an image comparison result; and indicating a tamper condition based at least in part on the image comparison result.

In some instances of the aforementioned embodiments, the image based tamper detection circuit includes an image sensor operable to obtain an initial image and an update image of the monitor target. In some cases, the imaging sensor uses Terahertz radiation to form the initial image and the update image. In one particular case, the monitor device is encapsulated by a plastic case, and the initial image is captured through the plastic case.

Turning to FIG. 1, a tracking and monitoring system 100 including a subject device in the form of a bracelet 120 hat has image based tamper detection in accordance with various embodiments of the present invention. Tracking and monitoring system 100 may be tailored for tracking human subjects as is referred in this detailed description. However, it should be noted that various implementations and deployments of tracking and monitoring system 100 may be tailored for tracking other animals or even inanimate objects such as, for example, automobiles, boats, equipment, shipping containers or the like.

Tracking and monitoring system 100 includes a subject device that may be, but is not limited to, a bracelet monitor 120 that is physically coupled to a human subject 110 by a securing device 190. In some cases, securing device 190 is a strap that includes a continuity sensor that when broken indicates an error or tamper condition. Further, in some cases, bracelet monitor 120 includes a proximity sensor that is able to detect when it has been moved away from an individual being monitored. When such movement away from the individual is detected, an error or tamper condition may be indicated. Such tamper detection circuitry is referred to herein as standard tamper detection circuitry. Based on the disclosure provided herein, one of ordinary skill in the art will recognize a variety of tamper sensors that may be incorporated in either bracelet monitor 120 or securing device 190 to allow for detection of removal of bracelet monitor 120 or other improper or unexpected meddling with bracelet monitor 120.

Additionally or alternatively, bracelet monitor 120 includes image based tamper detection that is operable to determine whether there has been any tampering with bracelet monitor based upon images. In operation, bracelet monitor 120 determines whether image based tamper detection is enabled. Such enabling may be done, for example, by an entity installing a bracelet monitor 120 on a subject being monitored. In some embodiments of the present invention, image based tamper detection is always enabled. In other embodiments of the present invention, enabling image based tamper detection is user programmable.

Where image based tamper detection is not enabled, bracelet monitor 120 only uses standard tamper detection. Again, such standard tamper detection may include, but is not limited to, strap continuity detection and/or proximity detection. Alternatively, where image based tamper detection is enabled, it is determined whether the image has been initialized. In one embodiment, upon installation and power up bracelet monitor 120 can determine whether it is attached to a subject (e.g., installed on the leg of a monitored individual). This may be done, for example, by detecting that securing device 190 has been connected. Where bracelet monitor 120 determines that it has recently been installed (i.e., it is determined that the image has not been initialized), an initial install image is taken by an image sensor (not shown), and the initial installed image is stored in either the bracelet monitor or is transmitted to central monitoring system 160 where it is stored. This image may be expressed in one or more characteristics that may then be compared with later taken images to determine whether a change in the image is sufficient to suggest tampering with the subject device. For example the image may indicate the mass of a leg to which the subject device is attached, and/or the size of the bone in the leg to which the subject device is attached. In one particular embodiment of the present invention, the image is an image based upon Terahertz radiation that can penetrate fabrics and plastics. Such imaging would allow the image sensor to be placed inside of the package holding bracelet monitor 120. Based upon the disclosure provided herein, one of ordinary skill in the art will recognize other characteristics that may be derived from the image for comparison with later taken images.

After the image has been initialized, bracelet monitor 120 periodically takes an update image. This update image is compared with the initial installed image and a determination is made by bracelet monitor 120 as to whether the two images are sufficiently similar to be called the same. The degree of similarity between the update image and the initial installed image required to be considered the same may be user programmable. Where bracelet monitor 120 considers the update image to be the same as the initial installed image, no tamper is indicated. Otherwise a tamper is indicated by bracelet monitor 120 to central monitoring system 160.

Additionally, bracelet monitor 120 may be designed to provide the location of human subject 110 under a number of conditions. For example, when bracelet monitor 120 is capable of receiving wireless GPS location information 130, 131, 132 from a sufficient number of GPS satellites 145, 146, 147 respectively, bracelet monitor 120 may use the received wireless GPS location information to calculate or otherwise determine the location of human subject 110. Alternatively or in addition, the location of a tethered beacon 180 that is local to bracelet monitor 120 may be used as the location of bracelet monitor 120. As yet another alternative, an AFLT fix may be established based on cellular communication with bracelet monitor 120. It should be noted that other types of earth based triangulation may be used in accordance with different embodiments of the present invention. For example, other cell phone based triangulation, UHF band triangulation such as Rosum, Wimax frequency based triangulation, S-5 based triangulation based on spread spectrum 900 MHz frequency signals. Based on the disclosure provided herein, one of ordinary skill in the art will recognize other types of earth based triangulation that may be used.

As yet another alternative, an AFLT fix may be established based on cellular communications between bracelet monitor 120 and a cellular communication system 150. Furthermore, when wireless communication link 133 between bracelet monitor 120 and cellular communications system 150 is periodically established, at those times, bracelet monitor 120 may report status and other stored records including location fixes to a central monitoring system 160 via wireless communication link 138.

Tracking and monitoring system 100 may include one or more tethered beacons 180. Within FIG. 1, a telemetric wireless link 141 has been depicted between tethered beacon 180a and bracelet monitor 120. Each tethered beacon 180 has an adjustable range to make telemetric wireless contact with bracelet monitor 120. At any point in time, depending on each beacon's 180 relative distance to bracelet monitor 120, none, one, or more than one tracking beacons 180 may be within transmission range of a single bracelet monitor 120. Likewise, it is further conceivable under various circumstances that more than one bracelet monitor 120 at times be within in range of a solitary tethered beacon 180.

Telemetric wireless communications path 141 established at times between tethered beacon 180a and bracelet monitor 120 illustrates a common feature of various different embodiments of the current invention. Some embodiments of the current invention vary on how, i.e. protocol, and what information and/or signaling is passed over wireless link 141. For example, in more simplified configurations and embodiments, each tethered beacon 180 is limited to repetitively transmitting its own beacon ID and motion sensor information. In that way, once bracelet monitor 120 is within transmission range of tethered beacon 180a and establishes wireless or wired reception 141, then bracelet monitor 120 can record and store received beacon ID. In particular cases where tethered beacon 180 is programmed with its physical location in addition to its beacon ID, the physical location information may also be repetitively transmitted. At a later time, for some embodiments of the present invention, bracelet monitor 120 can then report recorded readings from beacons 180 to the central monitoring system 160 over the cellular communication system 150 using wireless links 133 and 138 as depicted in FIG. 1. Furthermore, many embodiments allow for such transmissions and information passing to occur without being noticed by human subject 110, and unnoticed, automatically, and near effortlessly central monitoring system 160 is able to establish records and track human subject's 110 movements and whereabouts.

Of note, a particular tethered beacon 180 includes a beacon ID which may be, but is not limited to, a beacon identification number. This beacon identification number is transmitted to a bracelet monitor in proximity of the particular tethered beacon. This identification number may be associated with a known location of the tethered beacon. As tracking and monitoring system 100 relies on the location associated with the beacon ID provided from the tethered beacon 180 to establish the location of bracelet monitor 120, moving the particular tethered beacon away from the known location undermines the integrity of information provided from bracelet monitor 120 to central monitoring system 160. To avoid this, each of tethered beacons 180 are tethered to a fixed location power source that controls a level of motion sensing provided by the tethered beacon. Tethering beacons 180 to a power source may be done, for example, by connecting the tethered beacon to an AC wall outlet, connecting the tethered beacon to a telephone jack, connecting the tethered beacon to a cable jack, or the like. Based upon the disclosure provided herein, one of ordinary skill in the art will recognize a variety of non-movable power sources to which tethered beacons 180 may be connected in accordance with different embodiments of the present invention.

Tethered beacons 180 each include a multi-level motion sensing circuit that is operable to determine whether a respective tethered beacon 180 is moving. When a particular tethered beacon 180 is connected to a power source, a low sensitivity motion sensor circuit is employed to determine motion. In contrast, when the particular tethered beacon 180 is not connected to a power source, a high sensitivity motion sensor circuit is employed to determine motion. Thus, when tethered beacon 180 is connected to a power source and is less likely to be the subject of problematic motion (i.e., motion that impacts the integrity of location data transferred from bracelet monitor 120 to central monitoring system 160), the motion sensing employed is less sensitive. As such, the possibility of a false positive (e.g., indicating motion of the tethered beacon caused by loud music playing near the tethered beacon) when the tethered beacon 180 is unlikely to be moving is reduced. In contrast, the possibility of problematic motion is increased when tethered beacon 180 is disconnected from the power source, and in such a scenario the motion detection sensitivity is increased. In some cases, tethered beacons 180 include GPS and/or cellular communication based location circuitry that is turned on when motion is detected to obtain an updated location.

In other embodiments or configurations according to the present invention, each tethered beacon 180 also transmit status information related to its own device health and information related from each beacon's 180 internal tampering, movement, or other sensors via a communication system 170 to central monitoring system 160. This allows for detection of movement of beacons 180, and establishing some level of confidence that the physical location associated with each of beacons 180 is accurate.

Likewise, in some other embodiments, each bracelet monitor 120 contains a host of their own tampering, shielding, movement, and/or other sensors related to its own device health. While still further embodiments also include a host of other measurement transducers within bracelet monitor 120 for extracting information, and for later reporting, related to physical properties of human subject 110. For example, measuring for the presence of alcohol and/or other drugs present in human subject 110 may be included in some embodiments of bracelet monitor 120. As one example, the alcohol sensor discussed in U.S. Pat. No. 7,930,927 entitled "Transdermal Portable Alcohol Monitor and Methods for Using Such" and filed by Cooper et al. on Mar. 4, 2008. The entirety of the aforementioned reference is incorporated herein by reference for all purposes.

Tethered beacons 180 in alternative embodiments of the present invention also communicate with central monitoring system 160 independently of bracelet monitor 120. The tracking and monitoring system 100 illustrated in FIG. 1 shows tethered beacon 180b having both a wireless communication link 135 with cellular communication system 150, and also illustrates tethered beacon 180b having a hardwired communication link 139 with land communication system 170. Tracking and monitoring system 100 is also shown with tethered beacons 180a, 180b, and 180c each having hardwired land communication links 140, 139, and 136 respectively to land communication system 170. Tracking and monitoring system 100 further illustrates land communication system 170 having a hardwired communication link 134 to cellular communication system 150, and a hardwired communication link 137 to central monitoring system 160.

In some embodiments of the present invention, tethered beacons 180 are located in areas frequented by human subject 110 where bracelet monitor 120 is incapable of accessing information from the GPS system, or simply where power used accessing information from a GPS or cellular location system can be saved. Such beacons eliminate the need to perform an AFLT fix and avoid the costs associated therewith. As an example, human subject 110 may have a tethered beacon 180 placed within his home, and one also placed at his place of employment in close proximity to his work area. In this way, the two placed beacons, each at different prescribed times, can interact with his attached bracelet monitor 120 to periodically make reports to central monitoring system 160 to track movements and the whereabouts of human subject 110. All this can be done without incurring the costs associated with performing an AFLT fix.

Figure 2A:
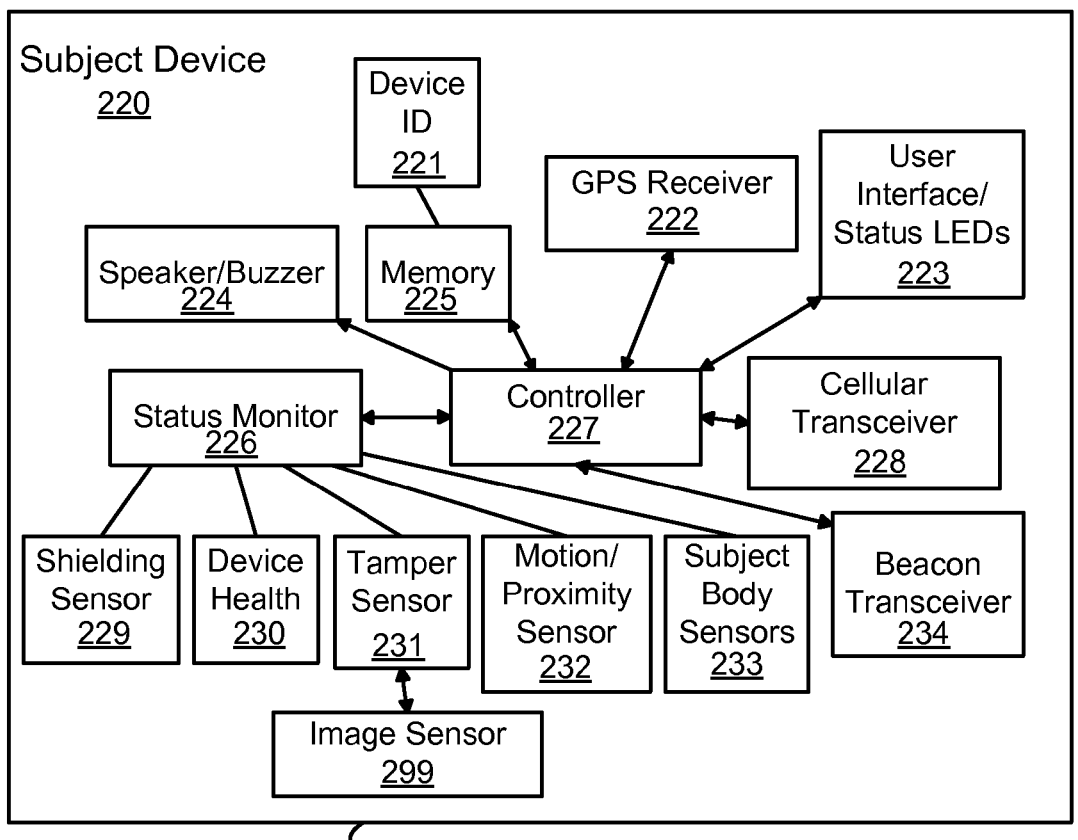
FIGS. 2a-2b depict a block diagram of a subject device that may be used in relation to the block diagram of FIG. 1 and showing it deployed in relation to a monitored subject in accordance with various embodiments of the present invention.

Turning to FIG. 2a, a subject device 220 is shown in accordance with one or more embodiments of the present invention. Subject device 200 may be used in place of monitor device 120 discussed above in relation to FIG. 1. As shown in FIG. 2a, subject device 220 includes a GPS receiver 222 that may be used for receiving location information from GPS satellites and determining a physical location of subject device 220. In addition, subject device 220 includes a device ID 221 stored in a memory 225 that is accessible by a controller 227. Controller 227 is able to interact with GPS receiver 222 and memory 225 at times for storing and generating records of successively determined GPS locations. Controller 227 may be, but is not limited to, a microprocessor, microcontroller or other device known in the art that is capable of executing software or firmware instructions.

Controller 227 at times functions in conjunction with a cellular transceiver 228 to send and receive data and signals through a cellular communication system (not shown). This link at times is useful for passing information and/or control signals between a central monitoring system (not shown) and subject device 220. The cellular communication system and cellular transceiver 228 can also at times often be useful for determining a physical location for subject devices 220 through AFLT when requested.

A status monitor 226, a user interface 223, and a speaker/buzzer 224 are all interconnected and interact through controller 227. In alternative embodiments of the present invention, status monitor 226 includes one or more of the following subcomponents: a set of shielding sensors 229 that are capable of determining whether subject device is being shielded from receiving GPS signals and/or if GPS jamming is ongoing, a set of device health indicators 230, a tamper sensor 231 that includes both standard tamper sensing capability and image based tamper detection capability facilitated by an image sensor 299, a motion/proximity sensor 232 capable of determining whether subject device 220 is moving and/or whether it is within proximity of human subject 210, and/or other body sensors 233 for making physical measurements of human subject 210. Based on the disclosure provided herein, one of ordinary skill in the art will recognize a variety of shielding sensors, a variety of device health transducers and indicators, a variety of tamper sensors, various different types of motion sensors, different proximity to human sensors, and various human body physical measurement sensors or transducers that may be incorporated into subject device 220 according to various different instances and/or embodiments of the present invention. A beacon transceiver 234 facilitates communications via beacons (not shown).

In operation, it is determined whether tamper sensor 231 is enabled to perform image based tamper detection. Such enabling may be done, for example, by an entity installing a subject device on a subject being monitored. In some embodiments of the present invention, enabling image based tamper detection is always enabled. In other embodiments of the present invention, image based tamper detection is user programmable.

Where image based tamper detection is not enabled, only standard tamper detection is utilized. Again, such standard tamper detection may include, but is not limited to, strap continuity detection and/or proximity detection. Alternatively, where image based tamper detection is enabled, it is determined whether image sensor 299 has captured an initial install image. In one embodiment, upon installation and power up subject device 220, subject device 220 determines whether it is attached to a subject (e.g., installed on the leg of a monitored individual). This may be done, for example, by detecting that the strap is initially connected. This may be referred to as a "strap restore event". Where subject device 220 determines that it has recently been installed, an initial install image is taken by image sensor 299, and the initial installed image is stored in either memory 225 of subject device 220 or is transmitted to a host computer where it is stored. This image may be expressed in one or more characteristics that may then be compared with later taken images to determine whether a change in the image is sufficient to suggest tampering with the subject device. For example the image may indicate the mass of a leg to which the subject device is attached, and/or the size of the bone in the leg to which the subject device is attached. Based upon the disclosure provided herein, one of ordinary skill in the art will recognize other characteristics that may be derived from the image for comparison with later taken images.

After the image has been initialized, it is determined whether a soft tamper is indicated. As used herein, a "soft tamper" may be an indication that some tampering with the subject device may have occurred but is insufficient by itself to indicate a tamper condition. As just some examples, a soft tamper may include, but is not limited to, an indication generated by motion proximity sensor 232 that subject device 220 has not moved for a user definable period of time, a reduction in temperature indicated by subject body sensors 233 indicating potential displacement from the leg of a monitored individual, and/or submersion of the subject device in water by shielding sensor 229. Based upon the disclosure provided herein, one of ordinary skill in the art will recognize other types of soft tampers that may be indicated.

Where a soft tamper is not indicated, it is determined whether a tamper is indicated using standard tamper determination mechanisms. Where a standard tamper is detected, that tamper is transmitted. Alternatively, where a soft tamper is indicated, an update image is taken by image sensor 299. In one particular embodiment of the present invention, the image is an image based upon Terahertz radiation that can penetrate fabrics and plastics. In such a case, image sensor 299 may generate an image through a sidewall 297 encompassing subject device 297. This update image is compared with the initial installed image and a determination is made as to whether the two images are sufficiently similar to be called the same. The degree of similarity between the update image and the initial installed image required to be considered the same may be user programmable. Where the update image is considered to be the same as the initial installed image, no tamper is indicated, and subject device 220 relies on standard tamper detection. Alternatively, where the update image is not considered to be the same as the initial installed image, a tamper is indicated by subject device 220.

Figure 2B:
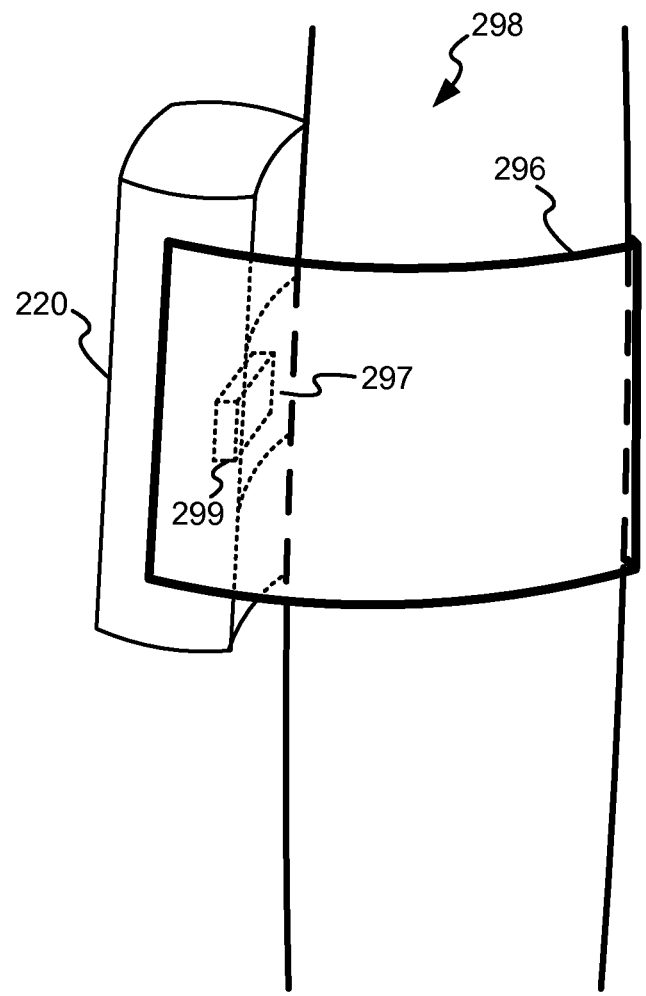

Turning to FIG. 2b, subject device 220 is shown deployed against a leg 298 of a monitored individual. As shown, a strap 296 holds subject device 220 in place against leg such that sidewall 297 of subject device 220 is against leg 298. In this orientation, image sensor 299 is directed toward leg 298.

Figure 3:
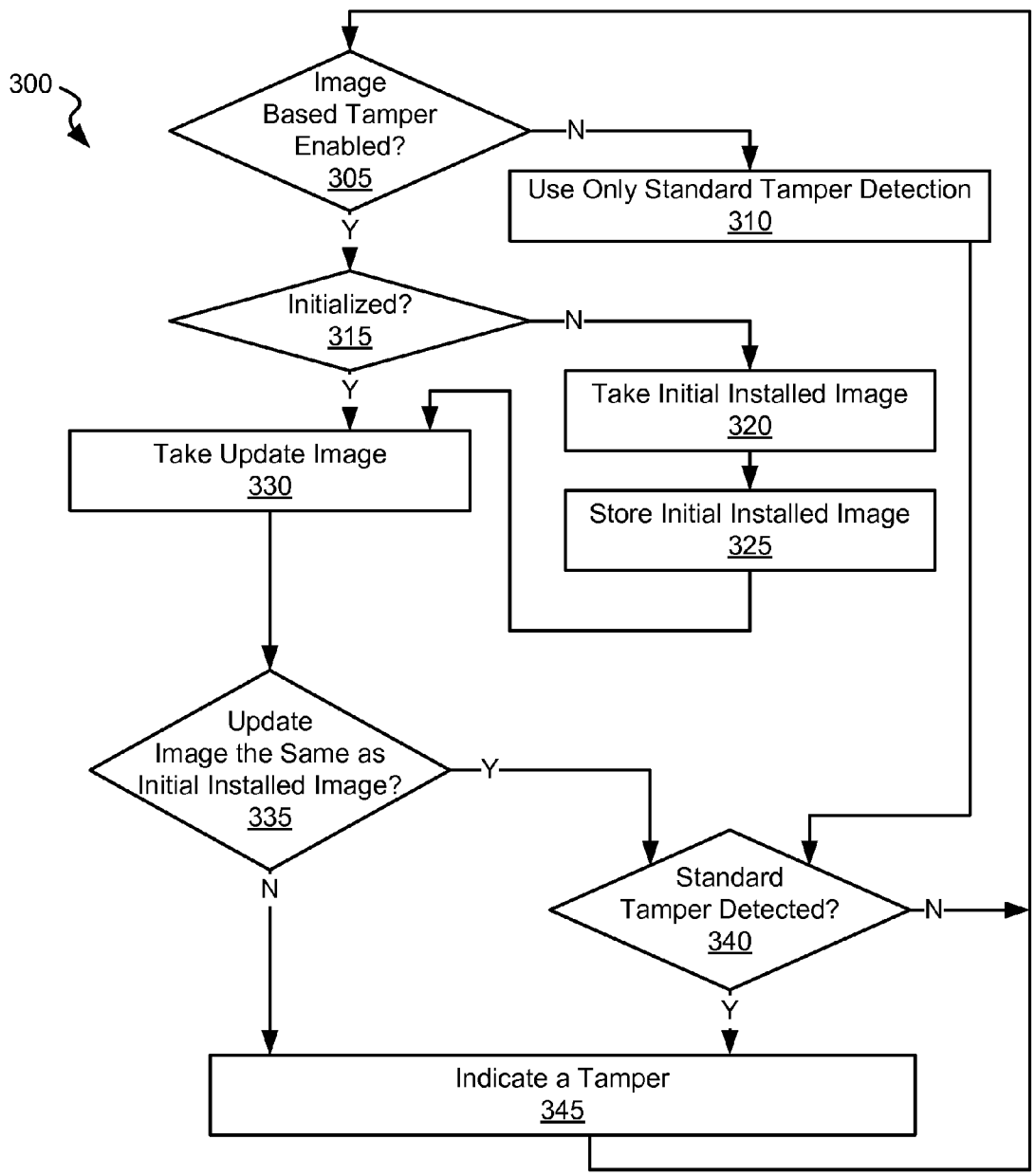
FIG. 3 is a flow diagram depicting a method for image based tamper detection in accordance with some embodiments of the present invention.

Turning to FIG. 3, a flow diagram 300 shows a method for image based tamper detection in accordance with some embodiments of the present invention. Following flow diagram 300, it is determined whether image based tamper detection is enabled (block 305). Such enabling may be done, for example, by an entity installing a subject device on a subject being monitored. In some embodiments of the present invention, enabling image based tamper detection is always enabled. In other embodiments of the present invention, image based tamper detection is user programmable.

Where image based tamper detection is not enabled (block 305), only standard tamper detection is utilized (block 310). Again, such standard tamper detection may include, but is not limited to, strap continuity detection and/or proximity detection. Alternatively, where image based tamper detection is enabled (block 305), it is determined whether the image has been initialized (block 315). In one embodiment, upon installation and power up the subject device can determine whether it is attached to a subject (e.g., installed on the leg of a monitored individual). This may be done, for example, by detecting that the strap is initially connected. This may be referred to as a "strap restore event". Where the subject device determines that it has recently been installed (i.e., it is determined that the image has not been initialized (block 315)), an initial install image is taken (block 320), and the initial installed image is stored in either the subject device or is transmitted to a host computer where it is stored (block 325). This image may be expressed in one or more characteristics that may then be compared with later taken images to determine whether a change in the image is sufficient to suggest tampering with the subject device. For example the image may indicate the mass of a leg to which the subject device is attached, and/or the size of the bone in the leg to which the subject device is attached. Based upon the disclosure provided herein, one of ordinary skill in the art will recognize other characteristics that may be derived from the image for comparison with later taken images.

After the image has been initialized (block 315), an update image is taken (block 330). This update image is compared with the initial installed image and a determination is made as to whether the two images are sufficiently similar to be called the same (block 335). The degree of similarity between the update image and the initial installed image required to be considered the same may be user programmable. Where the update image is considered to be the same as the initial installed image (block 335), it is determined whether a standard tamper (e.g., a break in strap continuity) is detected (block 340). Where a standard tamper is detected (block 340), a tamper is indicated (block 345). Otherwise, no tamper is indicated. Alternatively, where the update image is not considered to be the same as the initial installed image (block 330), a tamper is indicated (block 345).

Figure 4:
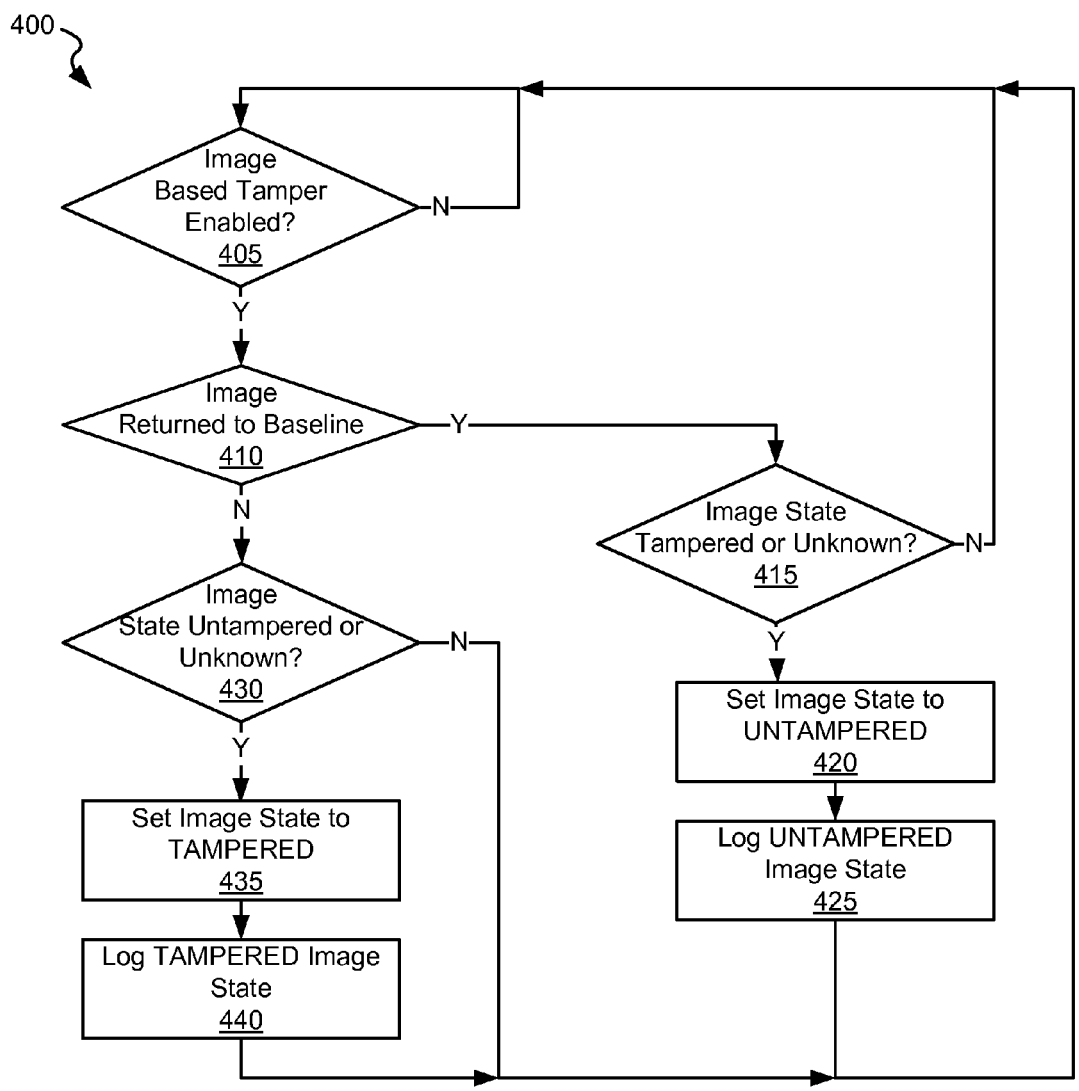
FIG. 4 is a flow diagram depicting another method for image based tamper detection in accordance with some embodiments of the present invention.

Turning to FIG. 4, a flow diagram 400 depicts another method for image based tamper detection in accordance with some embodiments of the present invention. Following flow diagram 400, it is determined whether image based tamper detection is enabled (block 405). Such enabling may be done, for example, by an entity installing a subject device on a subject being monitored. In some embodiments of the present invention, enabling image based tamper detection is always enabled. In other embodiments of the present invention, image based tamper detection is user programmable.

It is determined whether the image returned to a baseline (block 410). This involves comparing an updated image with a baseline image taken at the time the device was installed. Where the images are substantially the same, a tamper is not suggested. In this case, it is determined whether the image state was previously set as "TAMPERED" or "UNKNOWN" (block 415). Where the prior state was "TAMPERED" or "UNKNOWN" (block 415), then the image state is updated to be an "UNTAMPERED" state (block 420). Where the image state has changed, the change in the image state to "UNTAMPERED" is logged (block 425). Alternatively, where the image state was previously "UNTAMPERED" (block 415), there is no change in the image state and no logging of a state change.

Where, on the other hand, the image did not return to the baseline (block 410), it is determined whether the image state was previously set as "UNTAMPERED" or "UNKNOWN" (block 430). Where the prior state was "UNTAMPERED" or "UNKNOWN" (block 430), then the image state is updated to be an "TAMPERED" state (block 435). Where the image state has changed, the change in the image state to "TAMPERED" is logged (block 440). Alternatively, where the image state was previously "UNTAMPERED" (block 430), there is no change in the image state and no logging of a state change.

Figure 5:
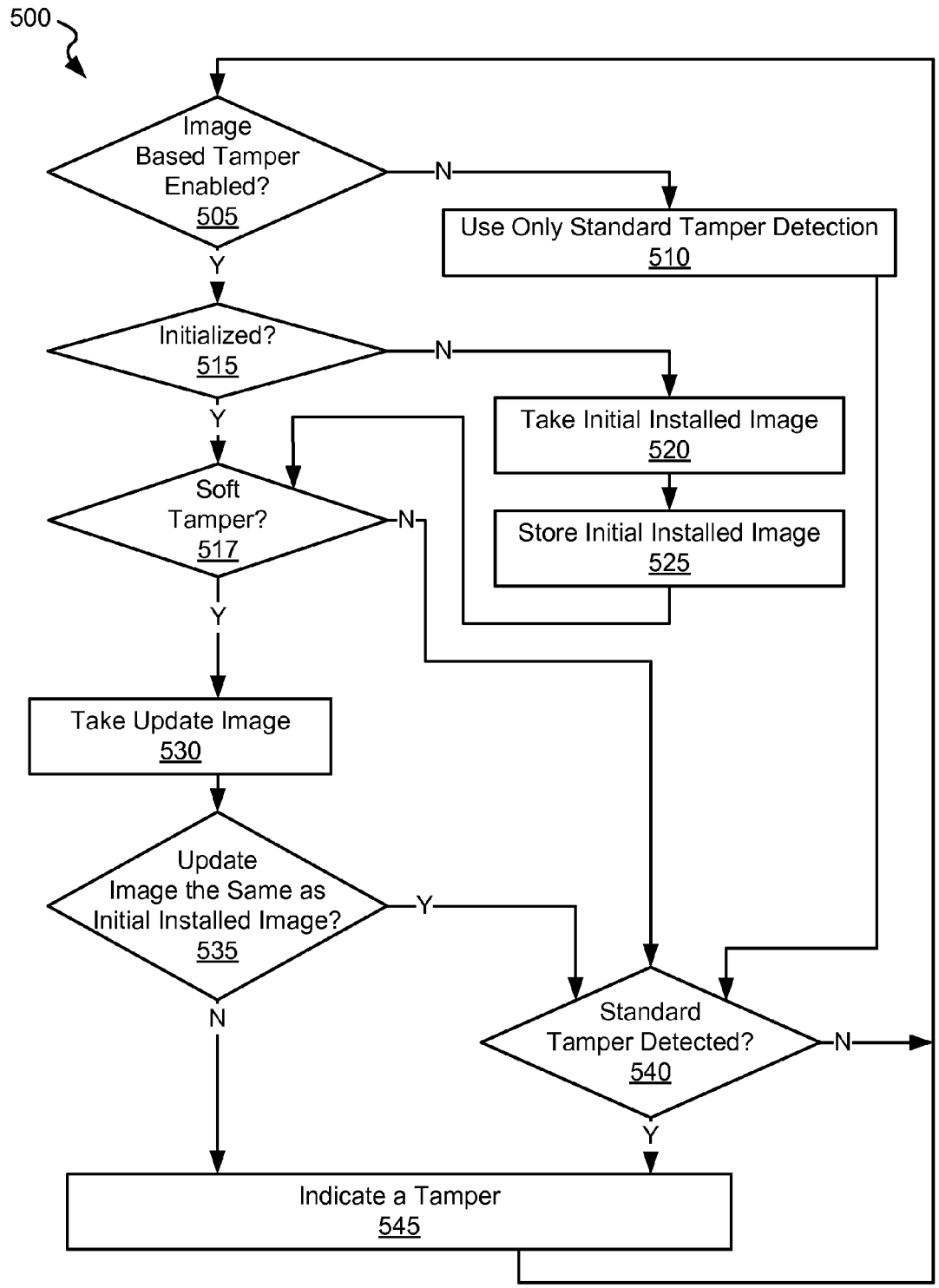
FIG. 5 is a flow diagram depicting another method for image based tamper detection in accordance with some embodiments of the present invention.

Turning to FIG. 5, a flow diagram 500 shows a method for image based tamper detection in accordance with some embodiments of the present invention. Following flow diagram 500, it is determined whether image based tamper detection is enabled (block 505). Such enabling may be done, for example, by an entity installing a subject device on a subject being monitored. In some embodiments of the present invention, enabling image based tamper detection is always enabled. In other embodiments of the present invention, image based tamper detection is user programmable.

Where image based tamper detection is not enabled (block 505), only standard tamper detection is utilized (block 510). Again, such standard tamper detection may include, but is not limited to, strap continuity detection and/or proximity detection. Alternatively, where image based tamper detection is enabled (block 505), it is determined whether the image has been initialized (block 515). In one embodiment, upon installation and power up the subject device can determine whether it is attached to a subject (e.g., installed on the leg of a monitored individual). This may be done, for example, by detecting that the strap is initially connected. This may be referred to as a "strap restore event". Where the subject device determines that it has recently been installed (i.e., it is determined that the image has not been initialized (block 515)), an initial install image is taken (block 520), and the initial installed image is stored in either the subject device or is transmitted to a host computer where it is stored (block 525). This image may be expressed in one or more characteristics that may then be compared with later taken images to determine whether a change in the image is sufficient to suggest tampering with the subject device. For example the image may indicate the mass of a leg to which the subject device is attached, and/or the size of the bone in the leg to which the subject device is attached. Based upon the disclosure provided herein, one of ordinary skill in the art will recognize other characteristics that may be derived from the image for comparison with later taken images.

After the image has been initialized (block 515), it is determined whether a soft tamper is indicated (block 517). Again, a "soft tamper" may be an indication that some tampering with the subject device may have occurred but is insufficient by itself to indicate a tamper condition. As just some examples, a soft tamper may include, but is not limited to, an indication that the subject device has not moved for a user definable period of time, a reduction in temperature indicating potential displacement from the leg of a monitored individual, and/or submersion of the subject device in water. Based upon the disclosure provided herein, one of ordinary skill in the art will recognize other types of soft tampers that may be indicated.

Where a soft tamper is not indicated (block 517), it is determined whether a tamper is indicated using standard tamper determination mechanisms (block 540). Where a standard tamper is detected (block 540), a tamper is indicated (block 545). Alternatively, where a soft tamper is indicated (block 517), an update image is taken (block 530). This update image is compared with the initial installed image and a determination is made as to whether the two images are sufficiently similar to be called the same (block 535). The degree of similarity between the update image and the initial installed image required to be considered the same may be user programmable. Where the update image is considered to be the same as the initial installed image (block 535), it is determined whether a standard tamper (e.g., a break in strap continuity) is detected (block 540). Where a standard tamper is detected (block 540), a tamper is indicated (block 545). Otherwise, no tamper is indicated. Alternatively, where the update image is not considered to be the same as the initial installed image (block 530), a tamper is indicated (block 545).

In conclusion, the present invention provides for novel systems, devices, and methods for monitoring individuals and/or assets. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A monitoring system, the monitoring system comprising:
   a monitor device attachable to a monitor target, wherein the monitor device includes:
   a non-image based tamper detection circuit operable to detect tampering with the monitor device and to provide a first tamper indicator;
   an image based tamper detection circuit operable to detect tampering with the monitor device based at least in part upon image comparison, and to provide a second tamper indicator, and wherein the image based tamper detection circuit forms an image of the size of a human bone around which the monitor device is attached; and
   wherein the monitor device indicates a tamper occurrence when at least one of the first tamper indicator and the second tamper indicator indicate the occurrence of a tamper condition.

2. The monitoring system of claim 1, wherein the image based tamper detection circuit includes an image sensor operable to obtain an initial image and an update image of the monitor target.

3. The monitoring system of claim 2, wherein the imaging sensor uses Terahertz radiation to form the initial image and the update image.

4. The monitoring system of claim 3, wherein the monitor device is encapsulated by a plastic case, and wherein the initial image is captured through the plastic case.

5. The monitoring system of claim 2, wherein the initial image is taken at a first time and the update image is taken at a second time, and wherein the image based tamper detection circuit is further operable to compare the update image with the initial image to yield an image comparison result.

6. The monitoring system of claim 2, wherein the initial image is captured upon attaching the monitor device to the monitor target.

7. The monitoring system of claim 6, wherein the initial image is a leg of the monitor target, and the update image is the leg of the monitor target.

8. The monitoring system of claim 1, wherein the monitor device is further operable to log an image state corresponding to a detection status.

9. The monitoring system of claim 8, wherein the detection status is selected from a group consisting of: an untampered status indicating no tamper was detected, and a tampered status indicating a tamper was detected.

10. The monitoring system of claim 2, wherein the monitor device includes a strap, and wherein the initial image is captured upon connection of the strap.

11. A method for device tamper detection, the method comprising:
   providing a monitor device operable to identify a location of a monitor target, and including: an image based tamper detection circuit, and a non-image based tamper detection circuit;
   determining whether the monitor device is attached to a monitor target using the non-image based tamper detection circuit to yield a first tamper indicator;
   capturing an initial image of the monitor target using the image based tamper detection circuit at a first time;
   capturing an update image of the monitor target using the image based tamper detection circuit at a second time, wherein the update image is an image of the size of a human bone around which the monitor device is attached;
   comparing the update image with the initial image to yield an image comparison result; and
   providing a second tamper indicator based upon the image comparison result; and
   indicating a tamper condition based at least in part on the combination of the first tamper indicator and the second tamper indicator.

12. The method of claim 11, wherein the image based tamper detection circuit includes an image sensor operable to obtain an initial image and an update image of the monitor target.

13. The method of claim 12, wherein the imaging sensor uses Terahertz radiation to form the initial image and the update image.

14. The method of claim 13, wherein the monitor device is encapsulated by a plastic case, and wherein the initial image is captured through the plastic case.

15. The method of claim 11, wherein capturing the initial image of the monitor target is done upon attaching the monitor device to the monitor target.

16. The method of claim 15, wherein the initial image is a leg of the monitor target, and the update image is the leg of the monitor target.

17. The method of claim 11, wherein the method further comprises:
   logging an image state corresponding to a detection status.

18. The method of claim 17, wherein the detection status is selected from a group consisting of: an untampered status indicating no tamper was detected, and a tampered status indicating a tamper was detected.

19. The method of claim 12, wherein the monitor device includes a strap, and wherein the initial image is captured upon connection of the strap.

20. The monitoring system of claim 1, wherein the non-image based tamper detection circuit is a continuity based tamper detection circuit, and wherein the first tamper indicator indicates the occurrence of a tamper condition when a discontinuity is detected.

21. The monitoring system of claim 1, wherein the non-image based tamper detection circuit is a proximity based tamper detection circuit, and wherein the first tamper indicator indicates the occurrence of a tamper condition when an increased distance is detected.

22. The monitoring system of claim 1, wherein the image based tamper detection circuit forms an image of a human extremity looking through fabric.

* * * * *